Patented June 18, 1935

2,005,574

UNITED STATES PATENT OFFICE 2,005,574

DYESTUFFS OF THE DIBENZANTHRONE SERIES

Alexander J. Wuertz, Carrollville, Wis., and Oakley M. Bishop, deceased, late of Wilmington, Del., by Eva P. Bishop, Wilmington, Del., and Wilmington Trust Co., Wilmington, Del., executors, assignors to E. I. du Pont de Nemours & Company, Wilmington, Del., a corporation of Delaware No Drawing. Original application May 2, 1930, Serial No. 449,355. Divided and this application August 3, 1934, Serial No. 738,372

9 Claims. (Cl. 260—61)

This invention relates to novel vat dyes of the dibenzanthrone series. More particularly, this invention deals with novel dyestuffs of the dibenzanthrone series obtainable by alkali-fusion of the novel phenyl-benzanthrones described and claimed in the copending application, Serial No. 449,355, of which the instant application is a division.

It is an object of this invention to produce new vat dyestuffs of the dibenzanthrone series. Other and further important objects of this invention will appear as the description proceeds.

These objects are accomplished by the present invention whereby beta-phenyl-anthraquinone is first condensed with sulfuric acid, glycerine, and a metallic reducing agent, according to the process of said copending application, to produce beta-phenyl-benzanthrone. The latter is then condensed by the aid of alcoholic alkali melts to produce the new dyestuffs.

The initial beta-phenyl-anthraquinone may contain substituents in the phenyl nucleus, such as halogen or hydroxy. In these cases the intermediate phenyl-benzanthrone and the final diphenyl-dibenzanthrone also contain the same substituents.

The condensation of phenyl-anthraquinone with glycerine, as above mentioned, may lead to a mixture of isomeric phenyl-benzanthrones instead of to a single compound. These may or may not be separated before alkali-fusion, as desired.

Without limiting this invention to any particular procedure, the following examples are given to illustrate the preferred mode of operation. Parts are by weight.

Example I 100 parts of para-chloro-beta-phenyl-anthraquinone are dissolved in 1500 parts of 95–100% sulfuric acid. To this solution is added a sufficient quantity of water to reduce the acidity approximately to 80–83%. The temperature is then raised to 112–115° C. and maintained at this level while 75 to 100 parts of glycerine and 25 to 35 parts of copper powder are added simultaneously and at such a rate that both reagents will be incorporated into the charge in a period of two to three hours. When this has been accomplished the temperature is raised to 118–120° C. and maintained at this point until none of the initial material, para-chloro-beta-phenyl-anthraquinone, can be detected. The melt is then diluted by pouring the same into a large volume of water. The precipitate is filtered off, washed until acid-free and then subjected to an alkaline extraction to remove alkaline water-soluble impurities.

The product thus obtained consists of a dark greenish-yellow powder which consists of at least three isomeric products, which can be separated by fractional crystallization from alcohol and benzene. One isomeric form is soluble in cold alcohol, another in hot alcohol and still another in benzene. The recrystallized products are yellow to greenish-yellow compounds having melting points as follows:

(a) Easily soluble product____M. P. 131.8–134.4° C.
(b) Less easily soluble product_____M. P. 102.4–103.6° C.
(c) Benzene soluble product____M. P. 160–162° C.

100 parts of the above product (either separated or unseparated) are introduced into an alcoholic potash melt (400 part of KOH+400 parts of ethanol) at 100° C. under good agitation. The temperature is raised to 140–160° C. and maintained at this level for approximately four hours. The melt is then poured into a large volume of water. The blue-black dyestuff which separates, is oxidized by aeration, filtered, washed free of alkali and dried. The dried material consists of a dark powder, giving dull greenish-blue sulfuric acid solutions having a brown fluorescence. It dyes from a blue hydrosulfite vat in greenish-blue or steel-blue shades, depending upon which of the several fractional products above are used. These new dyestuffs differ from the well-known dibenzanthrone products (violanthrone and isoviolanthrone) in that they they tend to give greenish shades rather than dark blue and violet.

Example II

The procedure is the same as in Example I, except that ortho-chloro-beta-phenyl-anthraquinone is used as initial material. The intermediate and final products obtained are in general similar to those obtained in Example I.

Example III

The procedure is the same as in Example I, except that meta-chloro-beta-phenyl-anthraquinone is used as initial material. The intermediate and final products obtained are in general similar to those obtained in Example I.

In a similar manner hydroxy-beta-phenyl-anthraquinone or unsubstituted beta-phenyl-anthraquinone may be condensed to give corresponding intermediates and dyestuffs.

The final products are apparently dibenzanthrone derivatives and may be represented by the general formula

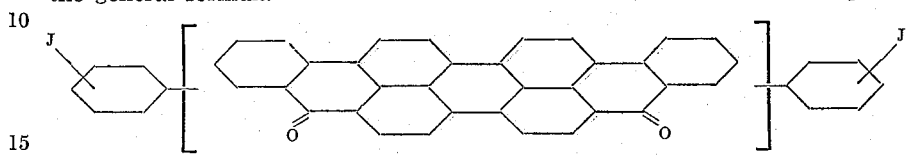

wherein J stands for hydrogen, or a simple inert substituent, such as halogen or hydroxy.

The condensation of the beta-phenyl-anthraquinone is not limited to copper as a reducing agent since other metal substances, for example iron and aluminum, may be used. The various isomers of the beta-phenyl-anthraquinone-glycerine condensation will ordinarily be separated and subsequently converted to the dyestuff but the group mixture of isomers obtained (for instance in Example I) can be treated directly in an alcoholic potash melt to produce a valuable dyestuff material consisting of a mixture of compounds.

The dyestuffs of this invention are characterized by better shades than present well-known dibenzanthrone colors. For instance the new dyestuffs obtained according to Example I, when applied to cotton produce much bluer shades than are now known.

The halogen beta-phenyl-benzanthrone and the corresponding dibenzanthrone derivatives are further useful in that they are capable of condensation with primary amino compounds.

As many apparently widely different embodiments of this invention may be made without departing from the spirit and scope thereof, it is to be understood that we do not limit ourselves to the specific embodiments thereof except as defined in the appended patent claims.

What is claimed is:

1. A dyestuff of the general formula

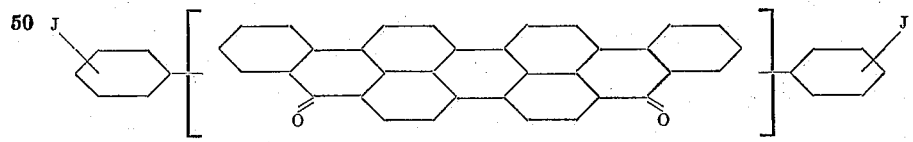

wherein J stands for hydrogen or a simple inert substituent, the phenyl nuclei being positioned in the anthrone portions of the molecule.

2. A diphenyl-dibenzanthrone, the phenyl nuclei being positioned in the anthrone portions of the molecule.

3. Dichloro-diphenyl-dibenzanthrone.

4. The dyestuff resulting by subjecting to caustic fusion the mixed product resulting from reacting a beta-phenyl-anthraquinone with glycerine, sulfuric acid and a reducing metal.

5. The process of producing a dyestuff, which comprises subjecting to caustic fusion a beta-phenyl-benzanthrone.

6. The process of producing a dyestuff, which comprises heating a beta-phenyl-benzanthrone with alcoholic potash to form a diphenyl-dibenzanthrone compound, diluting the reaction mass in water, and recovering the precipitated dyestuff.

7. The process of producing a dyestuff, which comprises subjecting to caustic fusion a chlorophenyl-benzanthrone.

8. The process of producing a dyestuff, which comprises subjecting to caustic fusion the mixed product resulting from reacting a beta-phenyl-anthraquinone with glycerine, sulfuric acid and a reducing metal.

9. The process which comprises heating substantially 100 parts of a chloro-beta-phenyl-benzanthrone with substantially 400 parts of caustic potash and 400 parts of ethanol at a temperature of about 140 to 160° C. for several hours, drowning the reaction mass in water, aerating the resulting suspension, and recovering the precipitated dyestuff.

ALEXANDER J. WUERTZ.
EVA P. BISHOP,
WILMINGTON TRUST CO.,
TILGHMAN JOHNSTON,
    *Vice President,*
*Executors of the Estate of Oakley M. Bishop, Deceased.*